(12) United States Patent
Neyama et al.

(10) Patent No.: US 8,514,344 B2
(45) Date of Patent: Aug. 20, 2013

(54) ILLUMINATING DEVICE AND LIQUID CRYSTAL DISPLAY DEVICE PROVIDED WITH THE SAME

(75) Inventors: Keisuke Neyama, Osaka (JP); Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 324 days.

(21) Appl. No.: 13/058,336

(22) PCT Filed: Jun. 3, 2009

(86) PCT No.: PCT/JP2009/060141
§ 371 (c)(1),
(2), (4) Date: Feb. 10, 2011

(87) PCT Pub. No.: WO2010/026811
PCT Pub. Date: Mar. 11, 2010

(65) Prior Publication Data
US 2011/0134364 A1 Jun. 9, 2011

(30) Foreign Application Priority Data
Sep. 4, 2008 (JP) ................................ 2008-227010

(51) Int. Cl.
G02F 1/1333 (2006.01)
G02F 1/1335 (2006.01)
(52) U.S. Cl.
USPC ............................................. 349/58; 349/61
(58) Field of Classification Search
USPC ...................................................... 349/58, 61
See application file for complete search history.

(56) References Cited

U.S. PATENT DOCUMENTS

| 7,891,858 | B2 * | 2/2011 | Ueyama | 362/631 |
| 2002/0080600 | A1 * | 6/2002 | Toyoda et al. | 362/31 |
| 2005/0073621 | A1 * | 4/2005 | Lee et al. | 349/53 |
| 2006/0285030 | A1 * | 12/2006 | Kim | 349/58 |
| 2007/0133222 | A1 * | 6/2007 | Watanabe et al. | 362/561 |
| 2007/0201248 | A1 * | 8/2007 | Jung et al. | 362/632 |
| 2008/0037285 | A1 * | 2/2008 | Eda | 362/631 |
| 2008/0074903 | A1 * | 3/2008 | Nam et al. | 362/613 |
| 2010/0195351 | A1 * | 8/2010 | Ueyama | 362/613 |
| 2011/0175533 | A1 * | 7/2011 | Holman et al. | 315/130 |

FOREIGN PATENT DOCUMENTS

| JP | 07-262589 A | 10/1995 |
| JP | 2002-203421 A | 7/2002 |
| JP | 2005-267881 A | 9/2005 |
| JP | 2005-294172 A | 10/2005 |
| JP | 2007-280619 A | 10/2007 |
| JP | 2008-166010 A | 7/2008 |

OTHER PUBLICATIONS

Official Communication issued in International Patent Application No. PCT/JP2009/060141, mailed on Jun. 30, 2009.
Shimojoh et al., "Illuminating Device and Liquid Crystal Display Device Provided With the Same," U.S. Appl. No. 13/057,811, filed Feb. 7, 2011.

* cited by examiner

*Primary Examiner* — Kaveh Kianni
(74) *Attorney, Agent, or Firm* — Keating & Bennett, LLP

(57) ABSTRACT

Provided is an illuminating device wherein generation of luminance deterioration and luminance nonuniformity is suppressed. An illuminating device (10) is provided with an LED (6) stored inside a storing space (10a), a power supply substrate (8) arranged outside the storing space (10a), and an FPC (7). The FPC (7) extends along a side section (1c) of a case member (1) so that the connecting terminal (7c) is away from the LED (6), and in such state, the connecting terminal (7c) is extracted to the outside from the inside of the storing space (10a).

10 Claims, 4 Drawing Sheets

ILLUMINATING DEVICE AND LIQUID CRYSTAL DISPLAY DEVICE PROVIDED WITH THE SAME

TECHNICAL FIELD

The present invention relates to an illuminating device and a liquid crystal display device provided therewith.

BACKGROUND ART

Conventionally, illuminating devices capable of outputting planar light have been known and used as backlight units for illuminating a liquid crystal display panel of a liquid crystal display device. Examples of such illuminating devices for liquid crystal display devices include a direct-type illuminating device, a side-light-type illuminating device, and the like.

Incidentally, the direct-type illuminating device is one in which a light source is arranged to be directly under a liquid crystal display panel. On the other hand, the side-light-type illuminating device is one in which a light guide plate is arranged to be directly under a liquid crystal display panel, and a light source is arranged to face a predetermined side-end surface of the light guide plate (see, for example, Patent Document 1). In such a side-light-type illuminating device, light emitted from the light source is introduced into the light guide plate via the predetermined side-end surface of the light guide plate. Then, the light introduced into the light guide plate is converted to planar light to illuminate the liquid crystal display panel.

FIG. 7 is a diagram schematically showing an example of a conventional side-light-type illuminating device, and FIG. 8 is a diagram for illustrating the shape of a case member (a member in which a light source and a light guide plate are placed) used for the conventional side-light-type illuminating device shown in FIG. 7. The structure of the conventional side-light-type illuminating device will be described below with reference to FIGS. 7 and 8.

In the conventional side-light-type illuminating device, as shown in FIG. 7, a plurality of light emitting diode devices (LEDs) 101 are used as the light source. The plurality of LEDs 101 are built into a module by being mounted on a same flexible printed wiring board (FPC) 102, such that light emitting surfaces of the LEDs 101 face a predetermined side-end surface (a light incident surface) of a light guide plate 103. An optical sheet 104 is disposed at a front surface (a light exit surface) side of the light guide plate 103, and a reflection sheet 105 is disposed at a rear surface side of the light guide plate 103. These members (the LEDs 101, the FPC 102, the light guide plate 103, the optical sheet 104, and the reflection sheet 105) are attached to a case member 106 that is formed in a box shape.

The case member 106, as shown in FIGS. 7 and 8, has a bottom portion 106a, and side portions 106b formed to stand up from the periphery of the bottom portion 106a. A space at the side of an upper surface of the bottom portion 106a of the case member 106 and surrounded by the side portions 106b is a housing space in which the above-described members (the LEDs 101, the FPC 102, the light guide plate 103, the optical sheet 104, and the reflection sheet 105) are placed.

Outside the housing space (at the side opposite to the side of the upper surface of the bottom portion 106a of the case member 106), there is disposed a power supply board 107, which is electrically connected to the LEDs 101 that are located within the housing space. Specifically, in the case member 106, an opening portion 106c is formed in one of the side portions 106b that is located at the LEDs 101 side, and via the opening portion 106c formed in the case member 106, a connection terminal of the FPC 102 that is connected to the power supply board 107 is drawn out from the inside to the outside of the housing space. By the FPC 102 whose connection terminal is drawn out through the opening portion 106c of the case member 106, the LEDs 101 located in the housing space and the power supply board 107 located outside the housing space are electrically connected to each other.

PRIOR ART DOCUMENT

Patent Document

Patent Document 1: JP-A-2005-267881

DISCLOSURE OF THE INVENTION

Problems to be Solved by the Invention

However, with the above-described conventional structure, since the opening portion 106c formed in the case member 106 is located in the vicinity of an arrangement region of the LEDs 101, once dust enters the housing space from the opening portion 106c of the case member 106, the dust sticks to the light emitting surfaces of the LEDs 101 or the light incident surface of the light guide plate 103. The dust sticking to the light emitting surfaces of the LEDs 101 or the light incident surface of the light guide plate 103 causes problems of degradation of the brightness, nonuniformity of the brightness, and the like.

The present invention has been made to solve the above problems, and an object of the present invention is to provide an illuminating device capable of reducing the degradation of the brightness and the occurrence of nonuniformity of brightness, and a liquid crystal display device provided therewith.

Means for Solving the Problem

To achieve the above object, according to a first aspect of the present invention, an illuminating device includes: a case member having: a bottom portion; and a plurality of side portions formed to stand up from a periphery of the bottom portion, the case member including a housing space formed as a space surrounded by the plurality of side portions and located at a side of an upper surface of the bottom portion; a light guide plate placed in the housing space, the light guide plate at least including: a light incident surface which is a predetermined side-end surface; and a light exit surface that is a surface perpendicular to the light incident surface and facing an illuminated body, and the light guide plate being placed above the upper surface of the bottom portion of the case member; a light emitting diode device placed in the housing space, the light emitting diode device being arranged such that a light emitting surface thereof faces the light incident surface of the light guide plate, and the light emitting diode device being mounted on a predetermined first side portion of the plurality of side portions of the case member; a power supply board arranged outside the housing space; and a connection member electrically connecting the light emitting diode device to the power supply board. Here, the connection member is extended, from a side where the light emitting diode device is located, along a second side portion of the case member that is different from the first side portion, such that a connection terminal of the connection member that is connected to the power supply board is far away from the light emitting diode device, and the connection terminal of the connection member is drawn out from an inside to an outside of the housing space through a drawing-out hole formed in the case member, with the connection member extended, from the side where the light emitting diode device is located, along the second side portion of the case member.

As described above, in the illuminating device according to the first aspect, the connection member (the member for electrically connecting the light emitting diode device to the power supply board) is extended from the light emitting diode device side along the second side portion of the case member that is different from the first side portion (the side portion where the light emitting diode device is mounted), such that a connection terminal of the connection member that is connected to the power supply board is far away from the light emitting diode device, and this makes it possible to form the drawing-out hole (the hole for drawing out the connection terminal of the connection member from an inside to an outside of the housing space) in the case member to be located far away from the arrangement region of the light emitting diode device. Thus, even if dust enters the housing space through the drawing-out hole, it is difficult for the dust to reach the arrangement region of the light emitting diode device, and this makes it possible to prevent the dust to stick to the light emitting surface of the light emitting diode device or the light incident surface of the light guide plate. As a result, it is possible to reduce occurrence of degradation and nonuniformity of brightness.

In the illuminating device according to the first aspect of the present invention, it is preferable that the light emitting diode device be mounted on a flexible printed wiring board, a predetermined portion of the flexible printed wiring board other than a mount portion where the light emitting diode device is mounted functioning as the connecting member, and that the predetermined portion of the flexible printed wiring board functioning as the connection member being bent to be thereby extended, from the side where the light emitting diode device is located, along the second side portion of the case member. With this structure, the flexibility of the flexible printed wiring board makes it easy to bend the predetermined portion of the flexible printed wiring board that functions as the connection member, and the bent predetermined portion of the flexible printed wiring board that functions as the connection member can be extended, from the side of the light emitting diode device, along the second side portion of the case member.

In this case, it is preferable that the flexible printed wiring board be formed by being cut out from a wiring-board material in a straight line shape. With this structure, it is possible to increase the number of flexible printed wiring boards that can be cut out from a wiring-board material.

In this case, it is preferable that density of a wiring pattern of the predetermined portion of the flexible printed wiring board that functions as the connection member be lower than density of a wiring pattern of the mount portion of the flexible printed wiring board. This increases the flexibility of the predetermined portion of the flexible printed wiring board that functions as the connection member, making it easy to bend the predetermined portion of the flexible printed wiring board that functions as the connection member. Incidentally, in this case, since the light emitting diode device is mounted on the portion (the mount portion of the flexible printed wiring board) having a dense wiring pattern, heat generated by the light emitting diode device can be dissipated satisfactorily.

In the illuminating device according to the first aspect described above, it is preferable that the drawing-out hole be closed in a state in which the connection terminal of the connection member is drawn out through the drawing-out hole. This structure makes it possible to prevent dust from entering the housing space through the drawing-out hole. As a result, still less dust sticks to the light emitting surface of the light emitting diode device and the light incident surface of the light guide plate, and degradation of brightness and occurrence of non-uniformity of brightness can be further reduced.

In this case, it is preferable that the illuminating device further include a reflection sheet that is arranged between the bottom portion of the case member and the light guide plate, and that the drawing-out hole be formed in the bottom portion of the case member and closed with the reflection sheet. This structure makes it easy to cover the drawing-out hole.

In the illuminating device according to the first aspect described above, it is preferable that the drawing-out hole be located in a vicinity of the power supply board. With this structure, it is possible to reduce the area of a portion of the connection member that is exposed (that is, a portion of the connection member that is located outside the housing space). This helps prevent the connection member from being caught by something, which contributes to easy handling.

According to a second aspect of the present invention, a liquid crystal display device includes: the illuminating device according to the first aspect described above; and a liquid crystal display panel irradiated with light from the illuminating device. With this structure, it is possible to reduce degradation of brightness and occurrence of non-uniformity of brightness.

Advantages of the Invention

As hitherto discussed, according to the present invention, it is easy to obtain an illuminating device capable of reducing degradation of brightness and occurrence of non-uniformity of brightness, and a liquid crystal display device provided therewith.

BEST MODE FOR CARRYING OUT THE INVENTION

Hereinafter, a description will be given of the structure of an illuminating device 10 of an embodiment of the present invention, with reference to FIGS. 1 to 6. Incidentally, in FIGS. 3 and 4, members constituting the illuminating device 10 are large spaced from each other for easy viewability.

Figure 1:
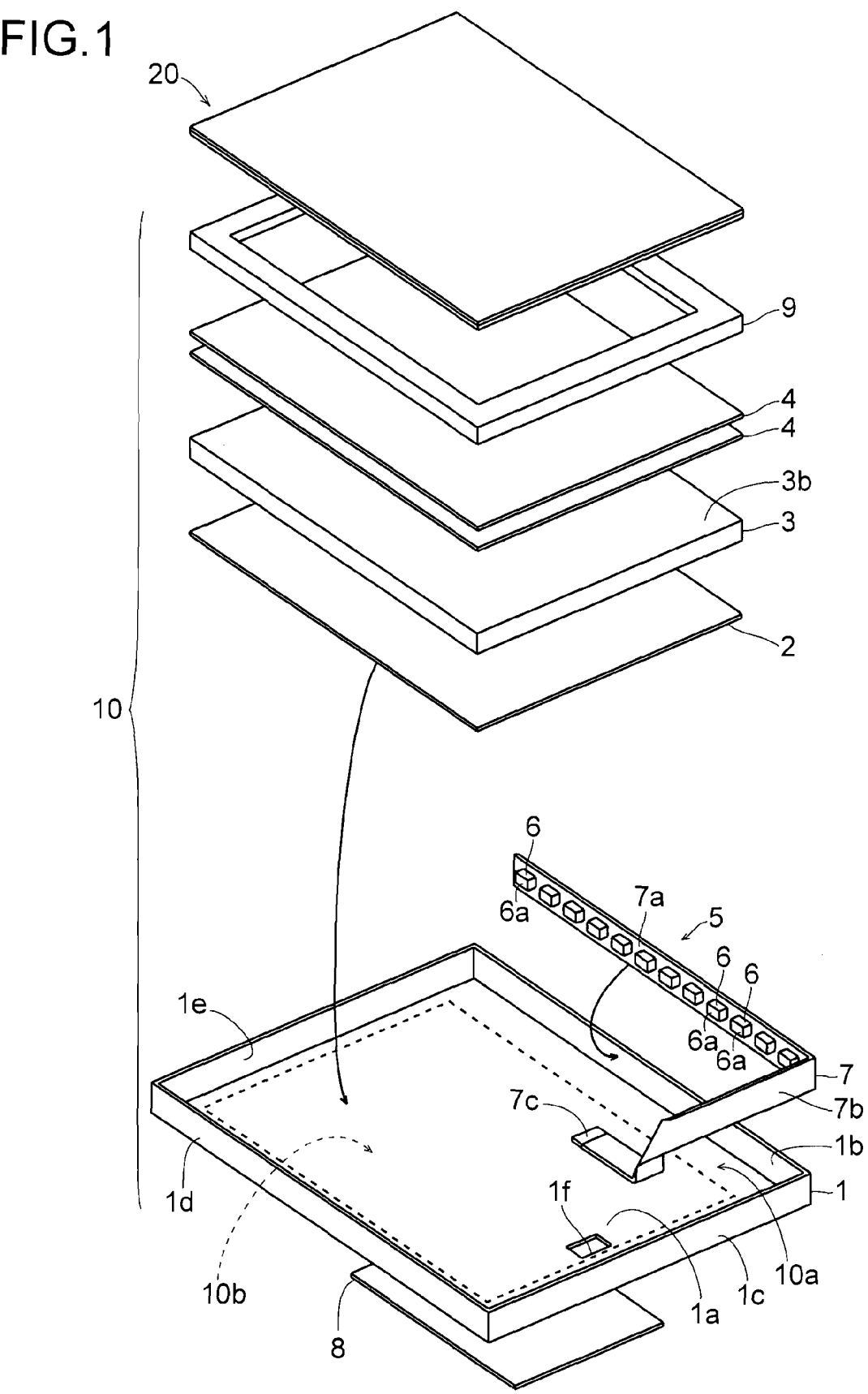
FIG. 1 An exploded perspective view of an illuminating device according to an embodiment of the present invention.

As shown in FIG. 1, the illuminating device 10 of this embodiment is used as a backlight unit incorporated in a liquid crystal display device, and structured so as to generate planar light and irradiate a liquid crystal display panel (an illuminated body) 20 with the light from a rear surface side of the liquid crystal display panel 20. Incidentally, the illuminating device 10 of this embodiment is incorporated, for example, in a liquid crystal display device for industrial use.

Figure 2:
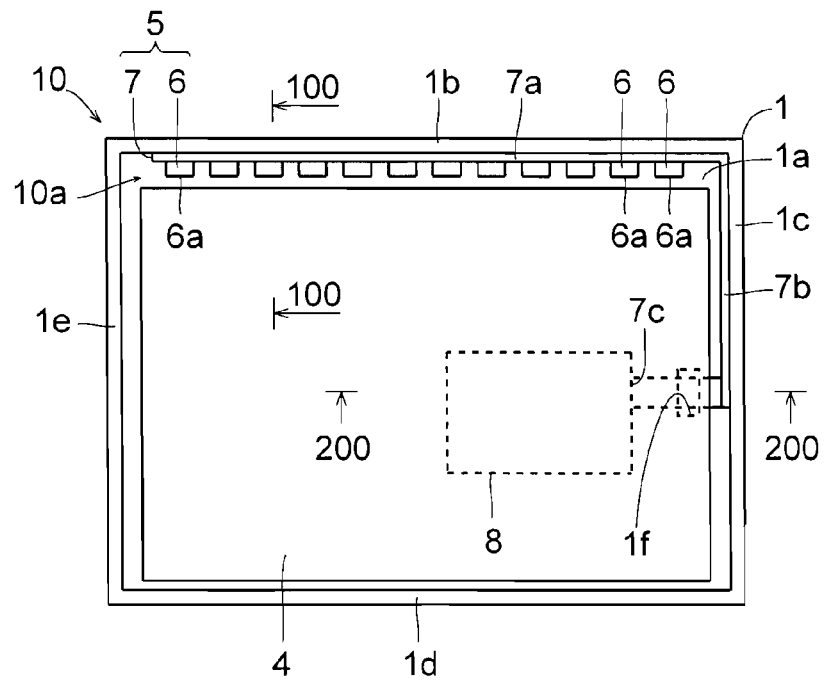
FIG. 2 A plan view of the illuminating device according to the embodiment shown in FIG. 1 as viewed from an upper surface side.
Figure 3:
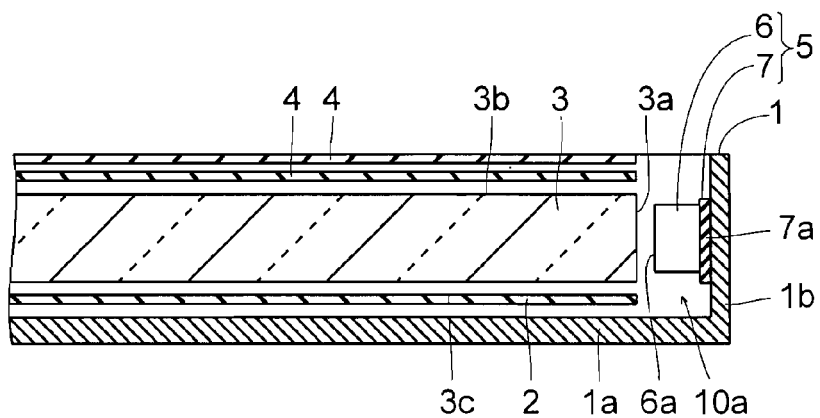
FIG. 3 A sectional view taken along line 100-100 in FIG. 2.

The illuminating device 10 is, as shown in FIGS. 1 to 3, of a side-light type, and includes at least a case member 1, a reflection sheet 2, a light guide plate 3, an optical sheet 4, and a light source module 5. The illuminating device 10 is structured such that the reflection sheet 2, the light guide plate 3, the optical sheet 4, and the light source module 5 are attached in a case member 1.

The case member 1 is formed of, for example, a sheet metal (such as an aluminum sheet or a stainless-steel sheet) or a resin mold product, and is also formed in a box shape having an opening on the liquid crystal display panel 20 side. That is, the case member 1 has a bottom portion 1a having a quadrangular shape in plan view, and four side portions 1b to 1e that are formed to stand up from the periphery of the bottom portion 1a. A space surrounded by the four side portions 1b to 1e on the side of an upper surface (a surface that faces the side where the liquid crystal display panel 20 is located) of the bottom portion 1a of the case member 1 is a housing space 10a, in which the reflection sheet 2, the light guide plate 3, the optical sheet 4, and the light source module 5 are placed.

The reflection sheet 2 is placed on the upper surface of the bottom portion 1a of the case member 1, and covers a later-described rear surface 3c of the light guide plate 3. Even if light leaks out from the rear surface 3c of the light guide plate 3, the reflection sheet 2 reflects the leaked light, and thus the provision of the reflection sheet 2 makes it possible to reintroduce light leaked out from the rear surface 3c of the light guide plate 3 into the light guide plate 3.

The light guide plate 3 is provided for guiding light from a later-described light emitting diode device (LED) 6 toward the liquid crystal display panel 20, and placed on the reflection sheet 2. That is, the light guide plate 3 is placed above the upper surface of the bottom portion 1a of the case member 1 via the reflection sheet 2.

The light guide plate 3 is formed of a transparent plate-shaped member made of resin, and the light guide plate 3 has four side-end surfaces including a predetermined side-end surface 3a which the LED 6 faces, and front and rear surfaces 3b and 3c connected to the four side-end surfaces. The predetermined side-end surface 3a of the light guide plate 3 functions as a light incident surface through which light from the LED 6 is introduced into the light guide plate 3. The front surface 3b of the light guide plate 3 is a surface that is perpendicular to the light incident surface 3a of the light guide plate 3, and that faces the liquid crystal display panel 20, and the front surface 3b functions as a light exit surface through which light introduced into the light guide plate 3 is outputted as planar light in a direction toward the liquid crystal display panel 20. Incidentally, in the following description, the predetermined side-end surface 3a of the light guide plate 3 will be referred to as the light incident surface 3a, and the front surface 3b of the light guide plate 3 will be referred to as a light exit surface 3b.

The optical sheet 4 includes a diffusion sheet, a prism sheet, and the like, and is placed on the light exit surface 3b of the light guide plate 3. The optical sheet 4 diffuses or collects light outputted from the light exit surface 3b of the light guide plate 3.

The light source module 5 includes a plurality of LEDs 6, a flexible printed wiring board (FPC) 7 on which the plurality of LEDs 6 are mounted, etc., and the light source module 5 is attached on an inner surface of a predetermined side portion 1b (a side portion located at the side of the light entrance surface 3a of the light guide plate 3) of the four side portions 1b to 1e of the case member 1. That is, the plurality of LEDs 6 are attached to the predetermined side portion 1b of the case member 1. Incidentally, the predetermined side portion 1b of the case member 1 to which the plurality of LEDs 6 are attached is an example of "the first side portion" of the present invention.

The plurality of LEDs 6 are arranged at predetermined intervals in a direction along the light incident surface 3a of the light guide plate 3 such that a light emitting surface 6a of each of the LEDs 6 faces the light incident surface 3a of the light guide plate 3. Furthermore, the plurality of LEDs 6 are electrically connected to a power supply board 8 arranged outside of the housing space 10a (the side of a rear surface of the bottom portion 1a of the case member 1 that is opposite to the side of the upper surface of the bottom portion 1a of the case member 1) via the FPC 7 on which the plurality of LEDs 6 are mounted.

The FPC 7 that electrically connects the plurality of LEDs 6 to the power supply board 8 integrally includes a mount portion 7a, and a connection portion 7b that is a predetermined portion that does not include the mount portion 7a. The mount portion 7a of the FPC 7 is a portion on which the plurality of LEDs 6 are mounted, and the mount portion 7a is adhered to an inner side surface of the predetermined side portion 1b of the case member 1. On the other hand, the connection portion 7b of the FPC 7 is a portion that is connected to the power supply board 8, and the connection portion 7b has a connection terminal 7c at an end thereof. Incidentally, the connection portion 7b of the FPC 7 is an example of "the connection member" of the present invention.

Here, in this embodiment, the connection portion 7b of the FPC 7 is extended, from the LEDs 6 side, along the side portion 1c (a side portion that is perpendicular to the predetermined side portion 1b) excluding the predetermined side portion 1b of the case member 1, such that the connection terminal 7c of the connection portion 7b of the FPC 7 is far away from the LEDs 6. Furthermore, with the connection portion 7b of the FPC 7 extended from the LEDs 6 side along the side portion 1c of the case member 1, the connection terminal 7c of the connection portion 7b of the FPC 7 is drawn out from the inside to the outside of the housing space 10a (that is, drawn out from the side of the upper surface of the bottom portion 1a of the case member 1 to the side of the rear surface of the bottom portion 1a of the case member 1). Incidentally, the side portion 1c of the case member 1 along which the connection portion 7b is extended is an example of "the second side portion" of the present invention.

Figure 4:
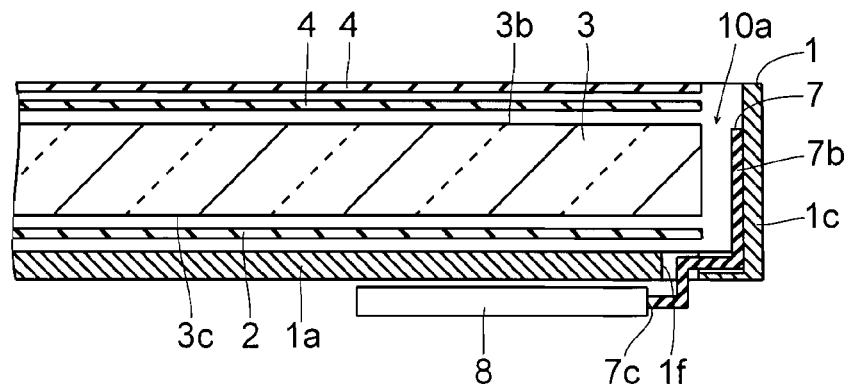
FIG. 4 A sectional view taken along line 200-200 in FIG. 2.

Specifically, as shown in FIGS. 1 and 4, in the bottom portion 1a of the case member 1, a drawing-out hole 1f is formed within a region 10b (a region surrounded by the broken line in FIG. 1) above which the light guide plate 3 is placed, and the connection portion 7b of the FPC 7 is extended until the connection terminal 7c of the connection portion 7b of the FPC 7 reaches the drawing-out hole 1f of the case member 1. The connection terminal 7c of the connection portion 7b of the FPC 7 is drawn out from the inside to the outside of the housing space 10a via the drawing-out hole 1f. The drawing-out hole 1f of the case member 1 is covered with the reflection sheet 2 with the connection terminal 7c of the connection portion 7b of the FPC 7 drawn out through the drawing-out hole 1f of the case member 1. Incidentally, the drawing-out hole 1f of the case member 1 is located in the vicinity of the power supply board 8.

Figure 5:
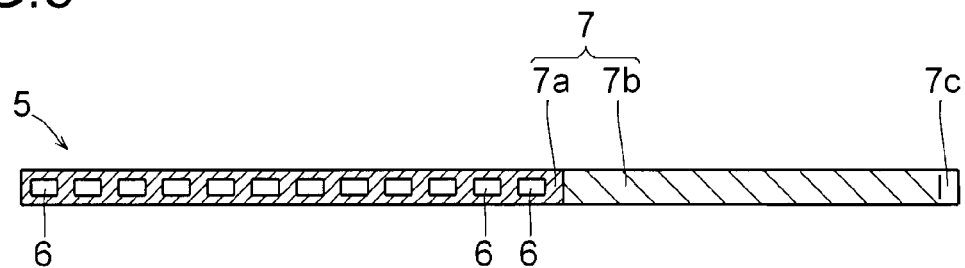
FIG. 5 A diagram for illustrating the shape of a flexible printed wiring board that is a component of the illuminating device according to the embodiment shown in FIG. 1.
Figure 6:
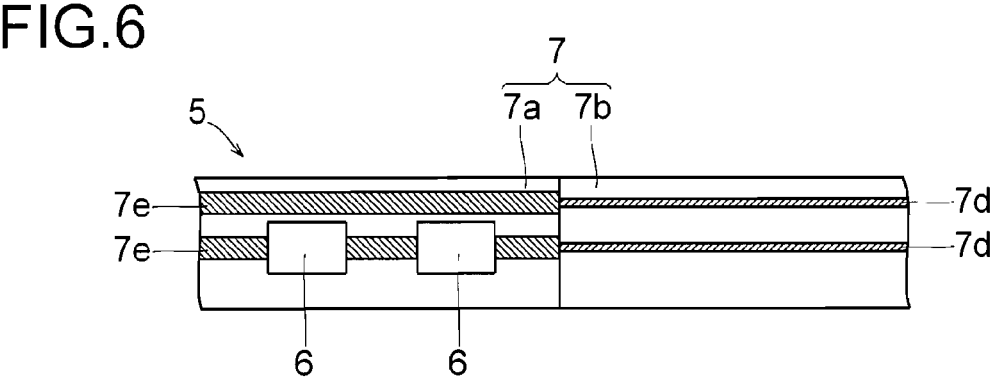
FIG. 6 An enlarged view showing part of the flexible printed wiring board shown in FIG. 5.
Figure 7:
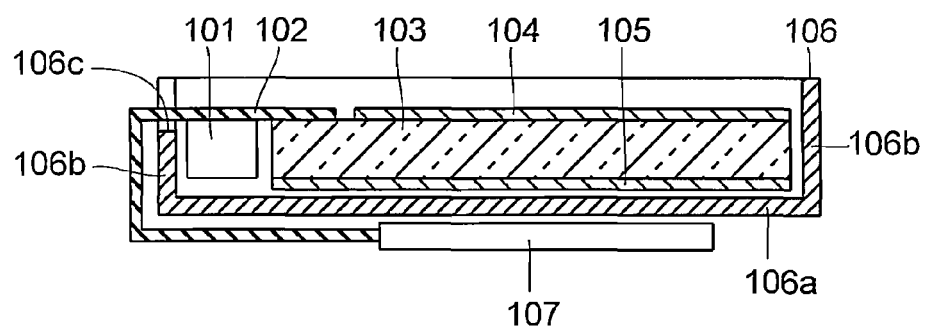
FIG. 7 A diagram schematically showing an example of a traditional side-light-type illuminating device.
Figure 8:
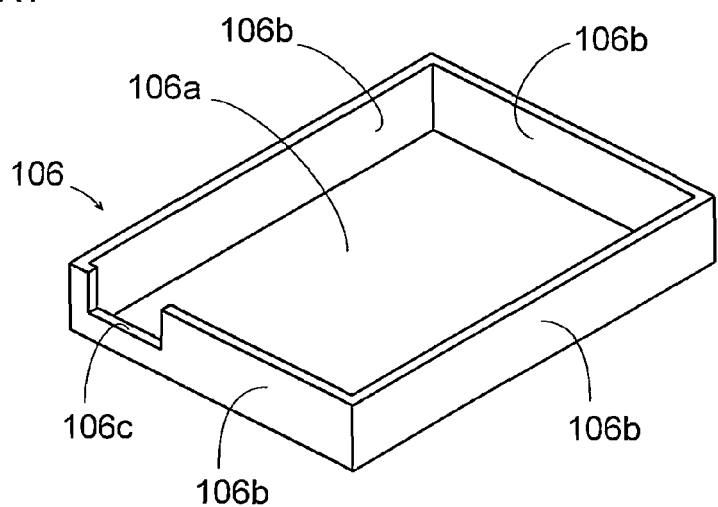
FIG. 8 A diagram for illustrating the shape of a case member (a member in which components such as a light source and a light guide plate are placed) that is used in the conventional side-light-type illuminating device shown in FIG. 7.

As shown in FIGS. 5 and 6, the FPC 7 is formed by being cut out from a wiring-board material in a straight line shape. In the FPC 7, the line width of a wiring pattern 7d of the connection portion 7b is smaller than that of a wiring pattern 7e of the mount portion 7a. That is, the wiring pattern 7d of the connection portion 7b is formed to be less dense than the wiring pattern 7e of the mount portion 7a. Incidentally, in FIG. 5, for simplicity of the drawing, the difference in density of the wiring pattern is indicated by the difference in hatching spacing. And, as shown in FIGS. 1 and 4, the connection portion 7b of the FPC 7 is bent to extend from the LEDs 6 side along the side portion 1c of the case member 1.

As shown in FIG. 1, in the state in which the reflection sheet 2, the light guide plate 3, the optical sheet 4, and the light source module 5 is placed within the housing space 10a, a picture-frame-shaped frame 9 is attached to the case member 1 so as to surround the opening of the case member 1. Rim portions of the frame 9 press the optical sheet 4 from above.

In this embodiment, as described above, the connection portion 7b of the FPC 7 is extended from the LEDs 6 side along the side portion 1c (the side portion that is perpendicular to the side portion 1b on which the LEDs 6 are attached) of the case member 1 such that the connection terminal 7c of the connection portion 7b of the FPC 7 is far away from the LEDs 6, and this makes it possible to locate the formation position of the drawing-out hole 1f in the case member 1 far away from the arrangement region of the LEDs 6. Thus, even if dust enters the housing space 10a through the drawing-out hole 1f formed in the case member 1, it is difficult for the dust to reach the arrangement region of the LEDs 6, and this makes it possible to prevent the dust from sticking to the light emitting surfaces 6a of the LEDs 6 or the light incident surface 3a of the light guide plate 3. As a result, it is possible to reduce the occurrence of degradation and nonuniformity of brightness.

Furthermore, in this embodiment, as described above, the LEDs 6 and the power supply board 8 are electrically connected to each other via the FPC 7 which is flexible, and this makes it easy to bend the connection portion 7b of the FPC 7 and extend the bent connection portion 7b of the FPC 7 from the LEDs 6 side along the side portion 1c of the case member 1.

In this case, since the FPC 7 can be formed by being cut out from a wiring-board material in a straight line shape, it is possible to increase the number of FPCs 7 that can be cut out from a wiring-board material.

Furthermore, since the wiring pattern of the connection portion 7b is formed to be less dense than that of the mount portion 7a, the connection portion 7b is increasingly flexible, which makes it easy to bend the connection portion 7b of the FPC 7. Incidentally, in this case, since the LEDs 6 are mounted on the portion (the mount portion 7a of the FPC 7) having a dense wiring pattern, heat generated by the LEDs 6 can be dissipated satisfactorily.

Moreover, in this embodiment, as described above, the drawing-out hole 1f of the case member 1 is covered with the reflection sheet 2 in the case in which the connection terminal 7c of the connection portion 7b of the FPC 7 is drawn out through the drawing-out hole 1f of the case member 1, and thereby dust is prevented from entering the housing space 10a through the drawing-out hole 1f of the case member 1. As a result, still less dust sticks to the light emitting surfaces 6a of the LEDs 6 and the light incident surface 3a of the light guide plate 3, and occurrence of degradation and nonuniformity of brightness can be further reduced.

In addition, in this embodiment, as described above, the drawing-out hole 1f of the case member 1 can be formed in the vicinity of the power supply board 8 to reduce the exposure of the connection portion 7b of the FPC 7 to the outside. This helps prevent the connection portion 7b of the FPC 7 from being caught by something, and this contributes to easy handling.

The embodiments disclosed herein are to be considered in all respects as illustrative and not restrictive. The scope of the present invention is set out in the appended claims and not in the description of the embodiments hereinabove, and includes any variations and modifications within the sense and scope equivalent to those of the claims.

LIST OF REFERENCE SYMBOLS 1 case member
1a bottom portion
1b side portion (first side portion)
1c side portion (second side portion)
1d, 1e side portion
1f drawing-out hole
2 reflection sheet
3 light guide plate
3a light incident surface
3b light exit surface
6 LED (light emitting diode device)
6a light emitting surface
7 FPC (flexible printed wiring board)
7a mount portion
7b connection portion (connection member)
7c connection terminal
7d, 7e wiring pattern
8 power supply board
10 illuminating device
10a housing space
20 liquid crystal display panel (illuminated body)

The invention claimed is:

1. An illuminating device, comprising:
a case member having: a bottom portion; and a plurality of side portions formed to stand up from a periphery of the bottom portion, the case member including a housing space formed as a space surrounded by the plurality of side portions and located at a side of an upper surface of the bottom portion;
a light guide plate placed in the housing space, the light guide plate at least including: a light incident surface which is a predetermined side-end surface; and a light exit surface that is a surface perpendicular to the light incident surface and facing an illuminated body, and the light guide plate being placed above the upper surface of the bottom portion of the case member;
a light emitting diode device placed in the housing space, the light emitting diode device being arranged such that a light emitting surface thereof faces the light incident surface of the light guide plate, and the light emitting diode device being mounted on a predetermined first side portion of the plurality of side portions of the case member;
a power supply board arranged outside the housing space;
a connection member electrically connecting the light emitting diode device to the power supply board; and
a reflection sheet arranged between the bottom portion of the case member and the light guide plate; wherein
the connection member is extended, from a side where the light emitting diode device is located, along a second side portion of the case member that is different from the first side portion, such that a connection terminal of the connection member that is connected to the power supply board is far away from the light emitting diode device;

the connection terminal of the connection member is drawn out from an inside to an outside of the housing space through a drawing-out hole formed in the case member, with the connection member extended, from the side where the light emitting diode device is located, along the second side portion of the case member;

the drawing-out hole is closed in a state in which the connection terminal of the connection member is drawn out through the drawing-out hole; and the drawing-out hole is formed in the bottom portion of the case member and closed with the reflection sheet.

2. The illuminating device of claim 1, wherein the light emitting diode device is mounted on a flexible printed wiring board, a predetermined portion of the flexible printed wiring board other than a mount portion where the light emitting diode device is mounted functioning as the connecting member; and wherein the predetermined portion of the flexible printed wiring board functioning as the connection member is bent to be thereby extended, from the side where the light emitting diode device is located, along the second side portion of the case member.

3. A liquid crystal display device, comprising:
the illuminating device of claim 2; and
a liquid crystal display panel irradiated with light from the illuminating device.

4. The illuminating device of claim 2, wherein the flexible printed wiring board is formed by being cut out from a wiring-board material in a straight line shape.

5. A liquid crystal display device, comprising:
the illuminating device of claim 4; and
a liquid crystal display panel irradiated with light from the illuminating device.

6. The illuminating device of claim 2, wherein density of a wiring pattern of the predetermined portion of the flexible printed wiring board functioning as the connection member is lower than density of a wiring pattern of the mount portion of the flexible printed wiring board.

7. A liquid crystal display device, comprising:
the illuminating device of claim 6; and
a liquid crystal display panel irradiated with light from the illuminating device.

8. The illuminating device of claim 1, wherein the drawing-out hole is located in a vicinity of the power supply board.

9. A liquid crystal display device, comprising:
the illuminating device of claim 8; and
a liquid crystal display panel irradiated with light from the illuminating device.

10. A liquid crystal display device, comprising:
the illuminating device of claim 1; and
a liquid crystal display panel irradiated with light from the illuminating device.

* * * * *